United States Patent Office 3,207,754
Patented Sept. 21, 1965

3,207,754
HETEROCYCLIC SULPHONAMIDO COMPOUNDS
Richard Clarkson, Macclesfield, England, assignor to Imperial Chemical Industries Limited, Millbank, London, England, a corporation of Great Britain
No Drawing. Filed Oct. 2, 1961, Ser. No. 141,980
Claims priority, application Great Britain, Nov. 18, 1960, 39,692/60
1 Claim. (Cl. 260—239.95)

This invention relates to heterocyclic compounds and more particularly it relates to thiadiazole derivatives which are useful as coccidiostatic agents and antibacterial agents, for example agents for the treatment of bacterial infections of the urinary tract.

According to the invention we provide thiadiazole derivatives of the formula:

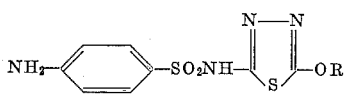

wherein R stands for an alkyl radical or for a cyclohexyl radical.

As suitable values for R there may be mentioned, for example, an alkyl radical of not more than 6 carbon atoms, for example the methyl, ethyl, isopropyl, n-butyl or n-hexyl radical.

According to a further feature of the invention we provide a process for the manufacture of the said thiadiazole derivatives which comprises the interaction of an aminothiadiazole derivative of the formula:

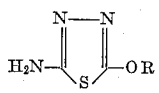

wherein R has the meaning stated above, with a compound of the formula:

wherein X stands for a radical which can be converted into the amino radical by known means, for example by hydrolysis or by reduction, and wherein Y stands for a halogen atom, for example the bromine or chlorine atom, whereafter X is converted to the amino radical by known means.

The said interaction may conveniently be carried out in the presence of an inert solvent or diluent, for example water, acetone, methylene dichloride or benzene, and it is preferably carried out in the presence of an acid-binding agent, for example sodium carbonate, sodium bicarbonate or triethylamine. The said interaction may be carried out in a solvent that has acid-binding properties, for example pyridine.

As suitable substituents (X) which can be converted into the amino radical by hydrolysis there may be mentioned, for example, acylamino radicals, for example the acetylamino radical, and alkoxycarbonylamino radicals, for example the ethoxycarbonylamino radical. As suitable substituents (X) which can be converted to the amino radical by reduction there may be mentioned, for example, the nitro radical and arylazo radicals, for example the phenylazo radical.

The said aminothiadiazoles which are used as starting materials in the process of the present invention may be obtained by the interaction of a hydrazine derivative of the formula H$_2$N.NH.CS.OR, or a salt thereof, wherein R has the meaning stated above, with a cyanogen halide.

As a suitable salt of said hydrazine derivative there may be mentioned, for example, a salt with an inorganic acid, for example hydrochloric acid. As suitable cyanogen halides there may be mentioned cyanogen bromide or cyanogen chloride. The said process for the preparation of said aminothiadiazoles is preferably carried out in the presence of a strong base, for example sodium hydroxide or potassium hydroxide, and it may conveniently be carried out in the presence of an inert diluent or solvent, for example water or an aliphatic alcohol, for example methanol or ethanol.

The said hydrazine derivatives themselves may be obtained by the interaction of the corresponding xanthate with sodium chloracetate, and subsequent interaction of the product thereof with hydrazine.

The invention is illustrated but not limited by the following examples in which the parts are by weight:

*Example 1*

6.4 parts of p-acetylaminobenzenesulphonyl chloride are added to a suspension of 3.3 parts of 2-amino-5-methoxy-1,3,4-thiadiazole in 15 parts of pyridine. The initial exothermic reaction is moderated with external cooling to keep the temperature of the mixture below 35° C. The mixture is kept at 25° C. for 16 hours, and then poured into a mixture of 15 parts of concentrated hydrochloric acid and 30 parts of ice. The mixture is filtered and the solid residue is crystallised from aqueous methanol to yield 2-(p-acetylaminobenzenesulphonamido)-5-methoxy-1,3,4-thiadiazole, M.P. 175–177° C. 3.9 parts of this compound are dissolved in 40 parts of 8% w./v. aqueous sodium hydroxide solution, and the mixture is heated under reflux for 1.5 hours. The solution is filtered, the filtrate is acidified to pH 5–6 with acetic acid, cooled to 20° C., and filtered. The solid residue is crystallised from aqueous methanol given 2-(p-aminobenzenesulphonamido)-5-methoxy-1,3,4-thiadiazole, M.P. 181–182° C.

The 2-amino-5-methoxy-1,3,4-thiadiazole used as starting material may be obtained as follows:

A solution of 3.2 parts of potassium hydroxide in 36 parts of methanol is cooled to 0–5° C., and 5.3 parts of methoxythiocarbonylhydrazine are added. The mixture is stirred and a solution of 5.3 parts of cyanogen bromide in 20 parts of methanol is slowly added; during this addition the mixture is cooled to keep its temperature below 5° C. When the addition is completed, the mixture is stirred for hour and it is then evaporated under reduced pressure to dryness. The solid residue is washed with 70 parts of water and then crystallised from water giving 2-amino-5-methoxy-1,3,4-thiadiazole, M.P. 162–163° C.

The methoxythiocarbonylhydrazine itself may be obtained as follows:

A solution of 20 parts of sodium hydroxide in 300 parts of water is added to a mixture of 44 parts of carbon disulphide and 80 parts of methanol. The mixture is shaken intermittently at 20° C. during 1 hour. A solution of 20 parts of sodium hydroxide and 47 parts of chloracetic acid in 200 parts of water is slowly added, and the mixture is kept at 20° C. for 20 hours. The solution is evaporated under reduced pressure to half-volume and this solution is added slowly to a stirred solution of 40 parts of 40% aqueous hydrazine in 100 parts of water. The latter solution is kept at 10–15° C. during the addition, whereafter the solution is stirred at 20° C. for 2 hours. The solution is extracted with ether and the ethereal extract is washed twice with saturated aqueous sodium chloride solution and then dried over anhydrous sodium sulphate. The ethereal solution is evaporated under reduced pressure to dryness and the solid residue is crystallised from benzene giving methoxy-thiocarbonylhydrazine, M.P. 72–74° C.

*Example 2*

3.8 parts of p-nitrobenzenesulphonyl chloride are added to a suspension of 2 parts of 2-amino-5-methoxy-1,3, 4-thiadiazole in 15 parts of dry pyridine, and the mixture is kept at 25° C. for 16 hours. The mixture is added to 50 parts of ice and the resultant solution is neutralised with concentrated hydrochloric acid, and then filtered. The solid residue is dissolved in 50 parts of 4% w./v. aqueous sodium hydroxide solution and the solution is neutralised with acetic acid. The mixtures is filtered and there is obtained 2-(p-nitrobenzenesulphonamido)-5-methoxy-1,3,4-thiadiazole, M.P. 192–195° C., as solid residue.

0.25 part of concentrated hydrochloric acid is added to a mixture of 2 parts of iron dust and 10 parts of 50% v./v. aqueous ethanol. When the pH of the mixture has risen to 3.5–4, 1 part of 2-(p-nitrobenzenesulphonamido)-5-methoxy-1,3,4-thiadiazole is added and the mixture is heated under reflux for 10 minutes. The mixture is cooled to 20° C., made alkaline with 8% w./v. aqueous sodium hydroxide solution, and filtered. The filtrate is diluted with 10 parts of water, acidified to pH 5–6 with acetic acid, and filtered. The solid residue is crystallised from aqueous methanol to yield 2-(p-aminobenzenesulphonamido)-5-methoxy-1,3,4-thiadiazole, M.P. 181–182° C.

Example 3

2.4 parts of p-nitrobenzenesulphonyl chloride are added to a suspension of 1.4 parts of 2-amino-5-ethoxy-1,3,4-thiadiazole in 10 parts of dry pyridine, and the mixture is kept at 25° C. for 16 hours. The product of the reaction is isolated by a similar procedure to that described in Example 2. There is thus obtained 2-(p-nitrobenzenesulphonamido)-5-ethoxy-1,3,4-thiadiazole, M.P. 198–200° C. This compound is reduced by a similar procedure to that described in Example 2 to yield 2-(p-aminobenzenesulphonamido)-5 - ethoxy - 1,3,4 - thiadiazole, M.P. 184–186° C.

The 2-amino-5-ethoxy-1,3,4-thiadiazole, M.P. 190–192° C., used as starting material, may be obtained by a similar process to that described in Example 1 for the preparation of 2-amino-5-methoxy-1,3,4-thiadiazole.

Example 4

2.4 parts of p-nitrobenzenesulphonyl chloride are added to the suspension of 1.6 parts of 2-amino-5-isopropoxy-1,3,4-thiadiazole in 15 parts of pyridine. The product of the reaction is isolated by a similar procedure to that described in Example 2, and there is thus obtained 2- (p-nitrobenzenesulphonamido)-5-isopropoxy-1,3,4-thiadiazole, M.P. 155–157° C. This compound is reduced by a similar procedure to that described in Example 2 to yield 2-(p-aminobenzenesulphonamido) - 5 - isopropoxy-1,3,4-thiadiazole, M.P. 182–183° C.

The 2-amino-5-isopropoxy-1,3,4-thiadiazole, M.P. 168–170° C., used as starting material, may be obtained by a similar process to that described in Example 1 for the preparation of 2-amino-5-methoxy-1,3,4-thiadiazole.

Example 5

2.4 parts of p-nitrobenzenesulphonyl chloride are added to a suspension of 1.55 parts of 2-amino-5-n-butoxy-1,3,4-thiadiazole in 15 parts of pyridine. The product of the reaction is isolated by a similar procedure to that described in Example 2, and there is thus obtained 2-(p-nitrobenzenesulphonamido)-5-n-butoxy - 1,3,4 - thiadiazole, M.P. 130–132° C. This compound is reduced by a similar procedure to that described in Example 2 to yield 2-(p-aminobenzenesulphonamido)-5-n-butoxy-1,3,4-thiadiazole, M.P. 190–192° C.

The 2-amino-5-n-butoxy-1,3,4-thiadiazole, M.P. 146–147° C., used as starting material, may be obtained by a similar process to that described in Example 1 for the preparation of 2-amino-5-methoxy-1,3,4-thiadiazole.

Example 6

2.4 parts of p-nitrobenzenesulphonyl chloride are added to a suspension of 1.9 parts of 2-amino-5-cyclohexyloxy-1,3,4-thiadiazole in 15 parts of pyridine. The product of the reaction is isolated by a similar procedure to that described in Example 2, and there is thus obtained 2-(p-nitrobenzenesulphonamido)-5-cyclohexyloxy - 1,3,4 - thiadiazole, M.P. 277–279° C. with decomposition. This compound is reduced by a similar procedure to that described in Example 2 to yield 2-(p-aminobenzenesulphonamido)-5-cyclohexyloxy - 1,3,4 - thiadiazole, M.P. 201–202° C.

2-amino-5-cyclohexyloxy-1,3,4-thiadiazole, M.P. 153–155° C., used as starting material, may be obtained by a similar process to that described in Example 1 for the preparation of 2-amino-5-methoxy-1,3,4-thiadiazole.

Example 7

102.4 parts of p-acetylaminobenzenesulphonyl chloride are added to a suspension of 52 parts of 2-amino-5-methoxy-1,3,4-thiadiazole in a mixture of 63 parts of pyridine and 100 parts of acetone maintained at 15° C. This temperature is maintained for a further 30 minutes after the addition is completed and the reaction mixture is then kept at 25° C. for 16 hours. It is then diluted with 500 parts of ice-water, acidified to pH 2–3 with concentrated hydrochloric acid, stirred for 30 minutes and then filtered. The solid residue is washed with water and there is obtained 2-(p-acetylaminobenzenesulphonamido)-5-methoxy-1,3,4-thiadiazole as the monohydrate, M.P. 120° C. The anhydrous compound, obtained by drying this material in vacuo over phosphorous pentoxide, has M.P. 175–177° C.

122 parts of the monohydrate are dissolved in 525 parts of 12% w./v. aqueous sodium hydroxide solution and the mixture is heated under reflux for 15 minutes. The solution is then rapidly cooled to 60° C., acidified to pH 5 with concentrated hydrochloric acid and filtered. The solid residue is crystallised from aqueous ethanol and there is thus obtained 2-(p-aminobenzenesulphonamido)-5-methoxy-1,3,4-thiadiazole, M.P. 181–182° C.

What I claim is:

The compound 2-(p-aminobenzenesulphonamido)-5-cyclohexyloxy-1,3,4-thiadiazole.

References Cited by the Examiner

UNITED STATES PATENTS

| | | | |
|---|---|---|---|
| 2,351,333 | 6/44 | Gysin | 260—239.75 |
| 2,358,031 | 9/44 | Roblin et al. | 260—239.75 |
| 2,430,439 | 11/47 | Winnek et al. | 260—239.75 |
| 2,494,524 | 1/50 | Sprague | 260—239.75 |

OTHER REFERENCES

Anderson et al.: Jour. Am. Chem. Soc., vol. 64 (1942), pages 2902–2905.

Bell et al.: Jour. Am. Chem. Soc., vol. 64 (1942), pages 2905–2907.

WALTER A. MODANCE, *Primary Examiner.*

IRVING MARCUS, *Examiner.*